United States Patent [19]

McShane

[11] Patent Number: 5,444,430

[45] Date of Patent: Aug. 22, 1995

[54] MOTOR VEHICLE SECURITY SYSTEM

[76] Inventor: Richard McShane, Mountain Ave., Llewellyn Park, N.J. 07052

[21] Appl. No.: 292

[22] Filed: Jan. 4, 1993

[51] Int. Cl.⁶ .......................................... B60K 25/10
[52] U.S. Cl. ............................ 340/426; 340/4725.5; 340/428; 340/429; 340/430; 307/10.2; 307/10.3
[58] Field of Search ..................... 307/10.2, 10.3; 340/425.5, 426, 428, 429, 430

[56] References Cited

U.S. PATENT DOCUMENTS

| | | | |
|---|---|---|---|
| 3,614,458 | 4/1970 | Stein | 307/10 |
| 3,907,060 | 9/1975 | Burton et al. | 180/114 |
| 4,107,962 | 8/1978 | MacKinnon | 70/243 |
| 4,462,716 | 7/1979 | Lisnow | 180/287 |
| 4,222,033 | 9/1980 | Brown | 340/64 |
| 4,300,495 | 11/1981 | Trevino et al. | 123/198 |
| 4,302,747 | 11/1981 | Belmuth | 340/426 |
| 4,485,887 | 12/1984 | Morano | 180/287 |
| 4,845,464 | 7/1989 | Drori et al. | 340/429 |
| 4,866,296 | 9/1989 | Thomas | 307/141 |
| 5,045,837 | 9/1991 | Gosker | 340/426 |

OTHER PUBLICATIONS

Paragon Security Corp, publication date unknown.
The Posse, Ad, NY Newsday Jan. 21, 1993.
The Posse, Brochure, Publication date unknown.
Chapman, Brochure, publication date unknown.

Primary Examiner—John K. Peng
Assistant Examiner—Daryl C. Pope
Attorney, Agent, or Firm—Thomas L. Adams

[57] ABSTRACT

A motor vehicle having an engine and drive train is protected by a security system including a sensor, a sequencer and an interrupter. The sensor can detect motion of the motor vehicle to provide a motion signal. The sequencer is coupled to the sensor and responds to the motion signal for providing a disable signal after production of the motion signal. The interrupter is coupled to the engine for disabling it in response to the disable signal. Thus the motor vehicle is disabled only after its motion is detected.

42 Claims, 4 Drawing Sheets

MOTOR VEHICLE SECURITY SYSTEM

BACKGROUND OF THE INVENTION

The present invention relates to apparatus and methods for securing a motor vehicle and, in particular, to security systems that disable the car after unauthorized use.

Car thieves will sometimes directly confront or assault an owner and forcibly take the car. When confronted with such a threat the first concern of the owner should be escape. Safety considerations may require the owner to abandon the vehicle to the thief. Nevertheless, there is a need for vehicle security systems that will frustrate the car thief.

A conventional car security system may either sound an alarm or disable the automobile immediately at the time of theft. Such a system may be ineffective since an experienced car thief will recognize the existence of the automobile security system. The thief may take the time to circumvent the security system, since often the vehicle is parked at a location favorable to the thief. In the case of a forcible robbery in the presence of an owner, disabling the automobile immediately can be dangerous, since contact between the owner and thief is prolonged.

Known automotive security systems have proposed disabling an automobile after the elapse of a time interval measured by a timer. In a simple system such as U.S. Pat. No. 4,222,033 a delayed circuit breaker placed in series with the ignition coil will disable the coil in 10 to 30 seconds after the vehicle is started. This known system also will sound the car horn after the car is disabled. A disadvantage with this type of system is the dependence on elapsed time. The owner cannot be certain that the thief will immediately move the car and successfully avoid traffic so that the car will stall at a safe distance from the owner. If the disabled car remains near the owner the thief will still present a threat. See also U.S. Pat. Nos. 3,614,485; 4,485,887; and 4,866,296.

In U.S. Pat. No. 4,302,747 an electronic timer can disable a car after an unspecified amount of time. This known system is designed to be armed at all times unless manually disabled by the operator in advance. This system still has the disadvantage of responding only to elapsed time and not to actual motion of the motor vehicle.

In U.S. Pat. No. 3,907,060 a solenoid valve can stop the fuel flow and stall a stolen car. The system is designed to allow the vehicle to operate for awhile with the residual fuel left downstream of the closed solenoid valve. This system does not depend upon distance travelled and the stalling of the engine depends strictly on the residual capacity of the fuel system. See also U.S. Pat. Nos. 4,107,962; and 4,300,495.

In U.S. Pat. No. 4,162,716 the operating time of a vehicle having a closed solenoid valve is extended by employing a fuel reservoir downstream from the solenoid valve. Again this system is not distance responsive and requires a reservoir that can be a service problem.

Accordingly, there is a need for a security system for a motor vehicle that ensures that the motor vehicle will be moved a safe distance from the owner before stalling. To be practical, such a system must be reliable, fail safe and cost effective.

SUMMARY OF THE INVENTION

In accordance with the illustrative embodiments demonstrating features and advantages of the present invention, there is provided a security system for a motor vehicle that has an engine and a drive train. The security system has a sensor means, a sequencing means and an interrupt means. The sensor means can detect motion of the motor vehicle to provide a motion signal. The sequencing means is coupled to the sensor means and responds to the motion signal for providing a disable signal after production of the motion signal. The interrupt means is coupled to the engine for disabling it in response to the disable signal. Thus the motor vehicle is disabled only after its motion is detected.

A related method of the same invention secures a motor vehicle having an engine and drive train. The method includes the step of detecting motion of the motor vehicle. Another step is disabling the engine, provided the motor vehicle is moved. Thus, the motor vehicle is disabled only after its motion is detected.

By employing such methods and apparatus an effective vehicle security system is achieved. In a preferred embodiment, a motion sensor is connected to the vehicle drive train. For example, a magnet mounted on an axle can rotate past a magnetic sensor to provide a count of wheel revolutions. In one embodiment, the distance sensor starts counting when an operator hits a panic button, concealed, for example, in a radio console. Alternatively, the panic button can be floorswitches located at each passenger and driver seat, which is especially useful if the owner is taken as a hostage.

Once the security system is armed, nothing further happens until the vehicle is moved by the thief. Thereafter, the preferred distance sensor counts the number of wheel revolutions. When the wheel revolutions indicate an adequate distance has been travelled (e.g., ½ mile) the counter operates a solenoid valve between the fuel tank and fuel pump (although the engine can be stalled in other ways such as opening the ignition circuit). Consequently, the engine stalls at a safe distance from the owner.

In one preferred embodiment, the vehicle can be restored to operation by a hidden release panel which may be mounted in, for example, the glove compartment. This panel can include a keyswitch or a keypad allowing the owner to restore the vehicle by sending a secret code. Alternatively, footswitches can restore the vehicle to operation, which may be important to a hostage should the thief become violently agitated by the stalling of the vehicle.

In some embodiments, when the vehicle stalls, alarms will operate. For example, the headlights can flash, the horn can sound, the doors can lock, and the windows can close or freeze.

In some embodiments, the security system may be normally armed without further action by the owner. In such a system, the owner must operate a concealed switch before moving the vehicle. Such a system is advantageous for a vehicle parked in a high crime area. Since the system is always armed, a car thief will again be able to move the vehicle briefly, only to stall in traffic, most likely in an exposed area where the thief will be inclined to abandon the vehicle rather than attempting to circumvent the security system.

Related accessories may include remote radio controls to either arm the security system or to restore the vehicle to operation. Such a remote control can also activate alarms (headlight and horn) and lock the vehicle doors and windows, independently of the distance sensor of the security system.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention when taken in conjunction with the accompanying drawings, wherein.

DETAILED DESCRIPTION OF THE PREFERRED EMBODIMENTS

Figure 1:
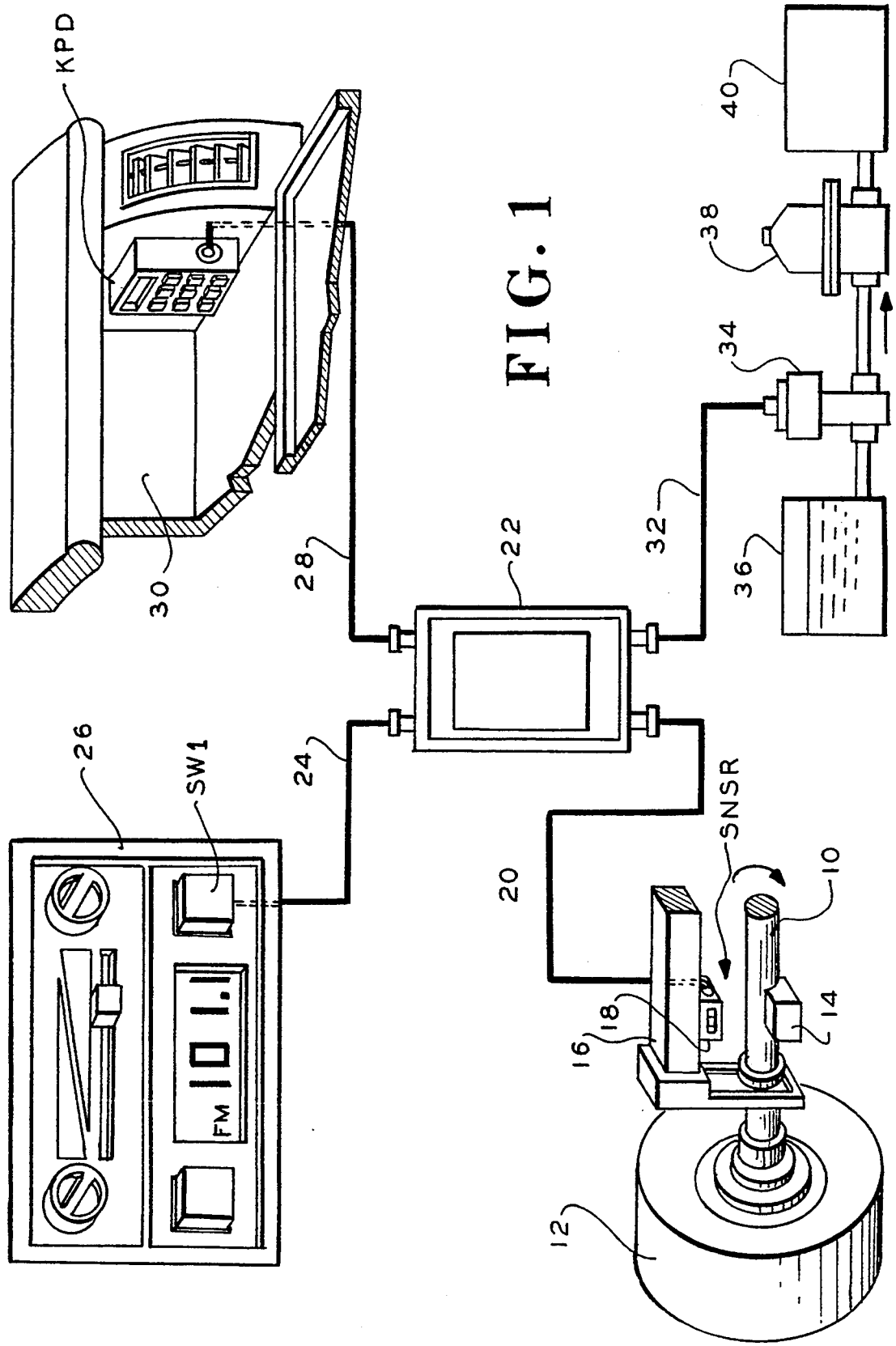
FIG. 1 is a schematic diagram of a security system in accordance with the principles of the present invention.

Referring to FIG. 1, a security system is shown having a sensor means SNSR. Sensor SNSR can detect rotation of a rotary member in the drive train of a motor vehicle, here for example, the rear axle 10 driving rear wheel 12. A magnetic source such as magnet 14 is mounted on the periphery of axle 10. The vehicle frame 16 (or a separate bracket mounted around axle 10) supports a magnetic sensor 18. Sensor 18 may be a Hall effect crystal, a high speed magnetic reed, a magnetic coil or other device for responding to the magnetic flux produced by magnet 14. In some embodiments, magnet 14 can be replaced by an electromagnet powered by an appropriate source. In other embodiments the position of the magnet and magnetic sensor can be reversed. Alternatively, the magnetic gap can between the magnet and sensor can be interrupted by a shutter mounted on axle 10. Sensor 18 is designed to produce an electrical pulse on line 20 upon each revolution on axle 10.

In some embodiments sensor SNSR can be replaced by a mechanical counter that may be directly driven by axle 10. In some embodiments, the counter may be hung, pendulum-like on axle 10 to maintain a vertical orientation and thereby measure the revolutions of axle 10. Sensor SNSR can be mounted at alternate locations and can measure the rotation of the drive axle, wheel, transmission output shaft or the rotation of other vehicle components that indicate motion.

Sensor line 20 is shown connected to an input of sequencing means 22, described hereinafter in further detail. Another input of sequencing means 22 is shown connected through line 24 to an operator actuatable switch SW1 hidden among similar control buttons on radio 26 mounted in the vehicle dashboard. Alternatively, the switch SW1 can be hidden under the dashboard, on the floor, etc.

Input line 28 of sequencing means 22 connects to a release means, shown herein as keypad KPD. As described further hereinafter, keypad KPD may be used to send a secret code that restores the operation of the vehicle. Keypad KPD is shown hidden inside glove compartment 30, although the keypad can be mounted in various other locations.

Output line 32 from sequencing means 22 connects to an interrupt means, shown herein as a solenoid operated fuel valve 34. The fuel lines of solenoid valve 34 are serially connected between fuel tank 36 and fuel pump 38. Accordingly, fuel can flow from the tank 36 through normally open valve 34 under the urging of pump 38 to supply fuel to the carburetor of engine 40. The valve 34, however, can disable engine 40 by cutting the fuel supply. Valve 34 may be located in various alternate locations that would be capable of cutting the fuel supply. In alternate embodiments, the vehicle can be disabled in other ways. For example, the electrical supply for the ignition system can be interrupted.

Figure 2:
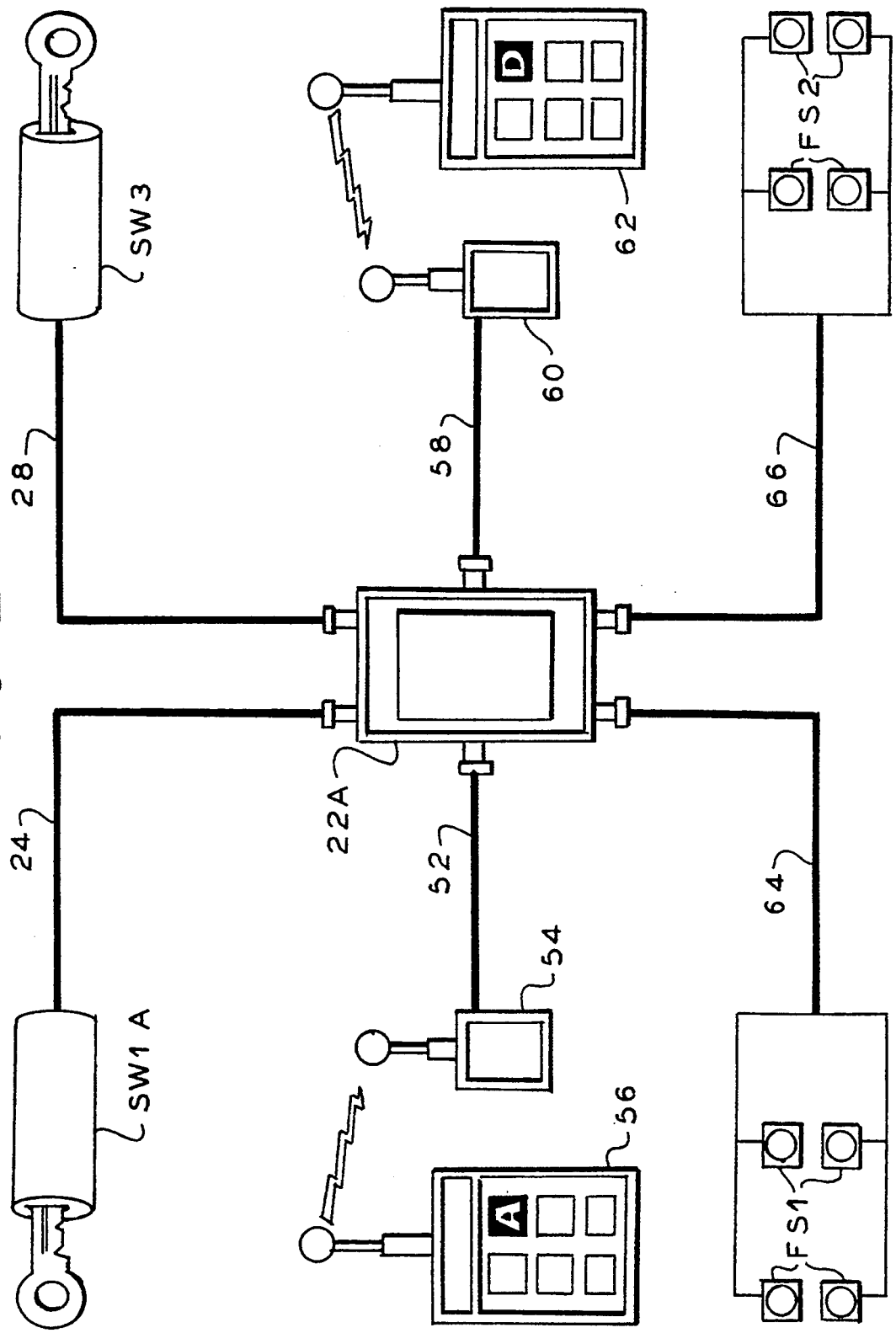
FIG. 2 is a schematic diagram of optional and alternate inputs for the security system of FIG. 1.

Referring to FIG. 2, the sequencing means is shown as a sequencer 22A with additional or optional inputs. In particular, previously illustrated line 24 is shown connected not to a panic button but to a contact on ignition switch SW1A. Accordingly, the system is armed whenever the vehicle is started. Previously illustrated line 28 is now shown connected not to a keypad, but to key switch 50 for restoring the vehicle to operation.

An auxiliary arming line 52 is connected from sequencer 22A to receiver 54. Receiver 54 receives a radio frequency (RF) signal from a remote RF transmitter 56. Device 56 can forwards a coded signal when appropriate buttons on its keypad are depressed. In the illustrated embodiment, the arming button is labeled "A." By a single depression of button "A" the transmitter 56 can send a signal to receiver 54 to arm sequencer 22A in a manner similar to operation of ignition switch SW1A (or panic button SW1 of FIG. 1).

An auxiliary input for restoring the motor vehicle to an operational status can be applied along line 58, which connects between sequencer 22A and receiver 60. Receiver 60 responds to properly coded RF signals to provide a restore signal along line 58. Receiver 60 can be constructed in the same fashion as previously mentioned receiver 54. Receiver 60 can be activated by a remote transmitter 62. Transmitter 62 can generate a coded RF signal based upon the depression of buttons on the illustrated keypad. For example, when button "D" is depressed, transmitter 62 can send an appropriate signal to receiver 60 to cause a reenable signal to be transmitted along line 58. This signal along line 58 operates in a manner similar to the reenable signal sent along line 28.

Still another auxiliary arming signal can be sent along line 64 to sequencer 22A from the parallel combination of foot switches FS1. Foot switches FS1 can be located on the vehicle floor adjacent to each seat for the passengers and driver. These switches can be used discreetly without alerting a thief that a security system is being armed. The foot switches are especially useful to a hostage in a passenger seat who must arm the security system without alerting the thief.

Another auxiliary disarming line 62 is shown connected between sequencer 22A and the parallel combination of foot switches FS2. Foot switches FS2 may again be used by a hostage. Should the thief become dangerously agitated when the vehicle becomes disabled, the hostage may restore the vehicle's operation by discreetly depressing one of the foot switches FS2, which are again located on the floor adjacent to each of the seats for the passengers and driver.

Figure 3:
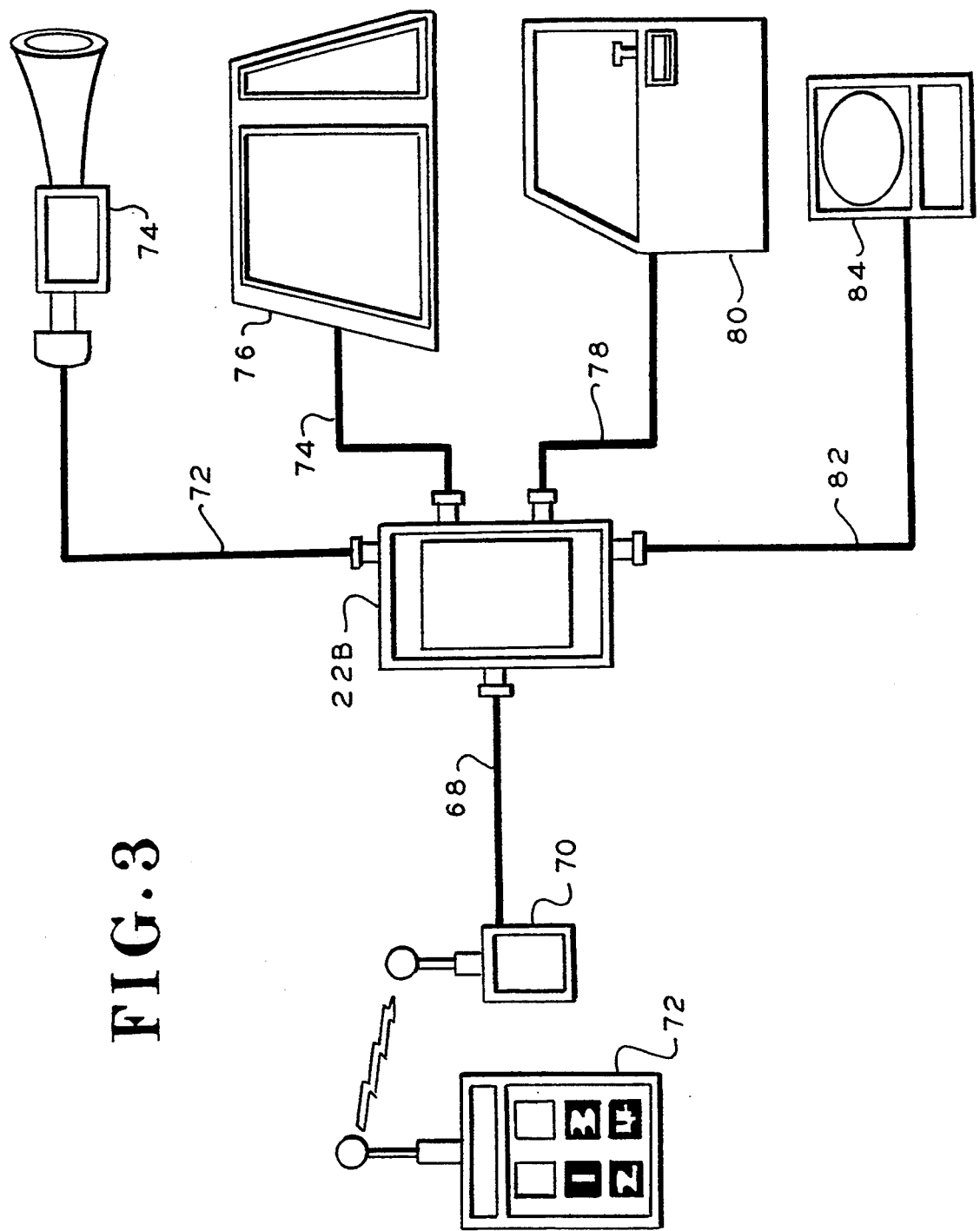
FIG. 3 a schematic diagram of several options for the system of FIG. 1, namely, a remote radio control and control of vehicle headlights, horn, door locks and electric windows.

Referring to FIG. 3, the previously illustrated system is shown with an alternate sequencing means 22B. Sequencer 22B can have all of the inputs and outputs previously illustrated, but also has the additional lines described herein. In particular, line 72 connects between sequencer 22B and the vehicle horn 74. An alarm signal on line 72 can either blow horn 74 continuously or with modulation: for example, a repeating beep or a modulated wail, depending upon the type of horn. An activation signal along line 74 from sequencer 22B can control power windows 76. Depending upon the window type, the windows can either be rolled closed or can be frozen in the current position. An activation signal along line 78 from sequencer 22B can operate electric door locks 80. Typically, all doors will be locked. In addition, an alarm signal along line 82 can activate vehicle headlights 84. The headlights can either be turned on continuously or, preferably, flashed.

These features can effectively capture a thief by securing the vehicle windows and doors, while simultaneously sending an alarm through the vehicle horn and headlights.

Line 68 connects between sequencer 22B and receiver 70. Receiver 70 responds to receipt of an appropriately encoded RF signal to transmit a command signal to sequencer 22B. Receiver 70 is activated by a portable remote transmitter 72. Transmitter 72 produces an encoded RF signal in accordance with depression of buttons on the illustrated keypad. When the proper code is tapped into the keypad, transmitter 72 can activate receiver 70 to provide an appropriate signal to sequencer 22B.

In some embodiments, the encoded signal from receiver 70 can indicate one of several commands. For example, the transmitted signal can simply arm the system in the manner described before so the vehicle stalls after being driven a predetermined distance. The alarms and locks can then be activated when the vehicle stalls. Alternatively, the signal along line 68 can immediately stall the vehicle. A third possible command signal along line 68 can activate the associated alarms and locks immediately, before the vehicle is disabled.

Figure 4:
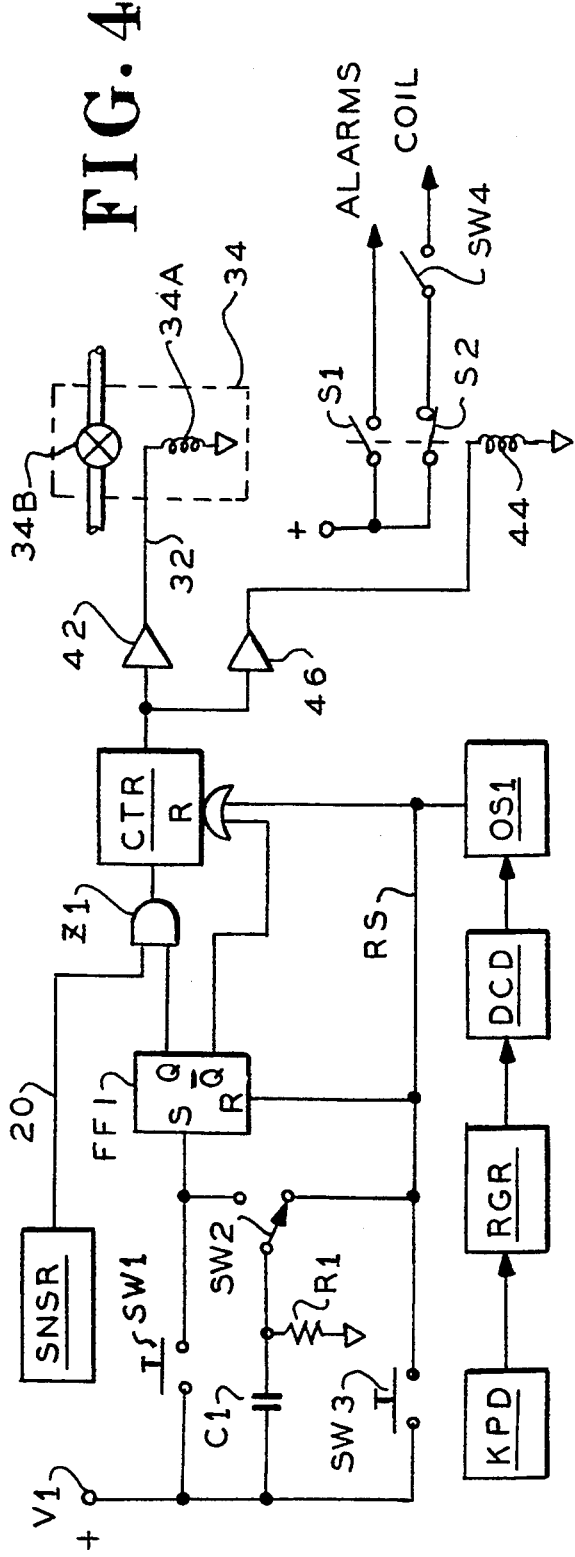
FIG. 4 is a schematic block diagram of circuitry in the system of FIG. 1.

FIG. 4 is a more detailed schematic diagram of the electrical and electronic components of the system of FIG. 1. Previously mentioned keypad KPD is shown connected through line 28 to register RGR. Keypad 28 and register RGR cooperate in the usual fashion whereby codes sent from the keypad KPD are stored in register RGR. The data of line 28 can be sent as serial or parallel data, depending upon the number of wires in line 28.

The data stored in register RGR is applied to a decoder DCD employing combinational logic. Decoder DCD is factory set to respond to a specific code. In other embodiments, however, decoder DCD can be programmed by a computer or other appropriate means to respond to a code selected by the owner through keypad KPD.

When the correct code is loaded into register RGR decoder DCD transmits a high signal to one shot multivibrator OS1 which produces a pulse along line RS of a predetermined duration. Line RS is connected to the reset lines of RS type flip-flop FF1 and one of the preset lines of digital counter CTR (two OR-connected preset lines are shown on counter CTR). Thus operating keypad KPD can reset the system so that flip-flop FF1 is reset and counter CTR will be at a preset count.

Reset line RS can also be actuated by operating momentary switch SW3. Reset line RS is therefore shown serially connected through reset switch SW3 to line V1. Switch SW3 may be the keyswitch previously described in connection with FIG. 2 as restoring vehicle operation and disarming the security system. Other disarming devices such as the remote radio control (60, 62) and the footswitches (FS2) of FIG. 2, if used, would be effectively connected in parallel with switch SW3.

Flip-flop FF1 can also be reset and counter CTR can be preset when power is first applied to the system from power line V1. When the system is first powered, a transient voltage is applied from line V1 through capacitor C1 to its junction with grounded resistor R1, which junction connects through internal switch SW2 (if set to the illustrated position) to line RS. Accordingly, the initial states of flip flop FF1 and counter CTR will be their reset and preset states, respectively.

In some embodiments, the wiper of switch SW2 can be repositioned to connect to set input S of flip-flip FF1 to initially bring it to the set state when power is first applied. Alternatively, switch SW2 can be eliminated and a contact on the ignition switch can momentarily apply a high signal to the set input S of flip-flop FF1 when the engine is being cranked. In either event, if the system is initially in an armed condition the vehicle will be disabled as described hereinafter, unless the operator takes the appropriate action.

Set input S of flip-flop FF1 is shown serially connected through previously mentioned panic switch SW1 to voltage line V1. If the arming devices of FIG. 2 are used (switch SW1A, footswitches FS1 or receiver/transmitter 54, 56), they will be effectively connected in parallel with switch SW1.

Previously mentioned sensor means SNSR, (comprising a magnetic sensor, accelerometer or the like) is shown connected through line 20 to one input of AND gate Z1 whose other input connects to the Q output of flip-flop FF1, whose inverted Q output connects to one of the OR tied preset input of counter CTR. The output of AND gate Z1 connects to the counting input of counter CTR. Counter CTR is a digital counter that can count hundreds or thousands of counts depending upon the type of signal being processed by it.

For example, a tire having a 2.5 foot diameter will rotate about 672 times in the course of a mile. Thus if the system is set to disable the vehicle after one mile of travel, the counter CTR can be preset to a count of 672 and then decremented once per wheel revolution. Thus, the disabling can occur when the counter is decremented to a zero count.

An output of counter CTR indicating that the zero count has been reached actuates drivers 42 and 46. Driver 42 connects through line 32 to the solenoid coil 34A of previously mentioned, solenoid operated valve 34, to close valve 34B. The output of counter CTR can also operate a relay coil 44 through driver 46. Relay coil 44 can close normally open relay contacts S1 and open normally closed contacts S2. Contacts S1 are shown connecting to various alarm circuits. These alarm circuits can involve sounding a siren, flashing the vehicle headlights, sounding the vehicle horn, locking the doors, locking or closing the windows, etc. Such functions were discussed previously in connection with FIG. 3. Normally closed contacts S2 are shown connecting power to ignition switch SW4, which provides the power to operate the ignition system of the vehicle. It will be appreciated that when solenoid valve 34 is included switch S2 is unnecessary and need not be connected in the circuit. Contacts S2 and solenoid valve 34 are simply alternative means for disabling the vehicle.

Figure 5:
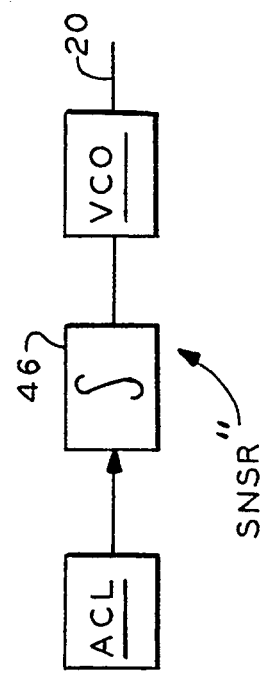
FIG. 5 is a schematic block diagram of an alternate sensor means that can operate in conjunction with the circuitry of FIG. 4.

Referring to FIG. 5, an alternate sensor system SNSR' is illustrated. This system is shown cooperating with previously illustrated magnetic sensor 18 again used to detect the rotation of magnet 14 on axle 10. The pulses produced by sensor 18 are applied to one shot multivibrator OS2. Multivibrator OS2 will therefore produce a high signal on its output line so long as pulses are repetitively applied. Thus multivibrator OS2 will provide a high signal essentially whenever the vehicle is moving. The output of multivibrator OS2 is connected to one input of AND gate Z2 whose other input is connected to the output of an oscillator TMR. Timer TMR can have a continuous repetition rate of 10 Hz, although for systems having a higher capacity counter, the timer can operate in the kilohertz range or higher. Thus the output of AND gate Z2 will be a series of pulses at a fixed frequency, which are provided whenever the vehicle is moving.

Thus when the system of FIG. 5 is employed, the system will respond to the number of minutes elapsing while the vehicle is actually moving. For example, the system can be designed to disable the vehicle when the vehicle has been actually moving for more than ten minutes. As used herein, the term "motion occurring beyond a predetermined extent," includes the concept of motion extending beyond a predetermined distance as well as the elapsing of a predetermined delay interval while the vehicle is moving.

Figure 6:
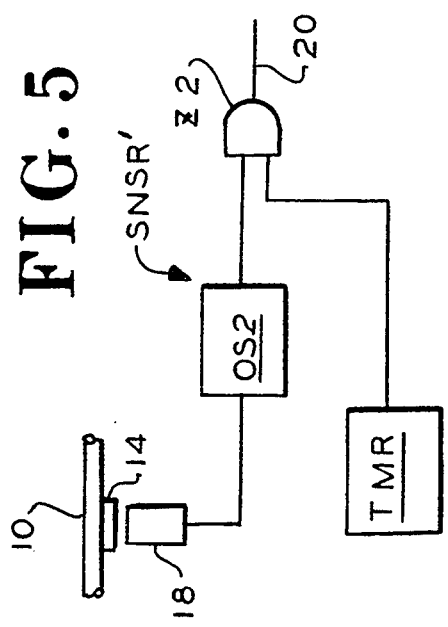
FIG. 6 is a schematic block diagram of a sensor means that is an alternate to that of FIG. 6.

Referring to FIG. 6, an alternate sensor SNSR" is shown with an accelerometer ACL driving an integrator 46 whose output drives a voltage controlled oscillator VCO. In this embodiment the output of accelerometer ACL is integrated once to produce a voltage proportional to velocity. This voltage can be applied to a voltage controlled oscillator VCO to produce a frequency proportional to velocity. Thus the voltage controlled oscillator can be used to produce pulses that are equivalent to rotation of the vehicle wheel.

Alternatively, the accelerometer output can be doubly integrated to produce an output having a magnitude proportional to distance travelled. That output can be applied to a threshold detector to provide a disable signal when the distance travelled exceeds a predetermined amount.

To facilitate an understanding of the principles associated the foregoing apparatus, its operation will be briefly described. As mentioned previously, when power is applied to the system along line V1, the flip-flop FF1 (FIG. 2) and counter CTR are initialized to a disarmed state, if switch SW2 is in the position illustrated in FIG. 4. Under these circumstances the system will do nothing further unless other switches are actuated. Were switch SW2 thrown to the other position, flip-flop FF1 would be initially set when power is applied and would be armed to perform the functions hereinafter described. Were the system normally armed, disabling switch SW3 can be depressed to reset flip-flop FF1 and bring it to the disarmed state.

However, with the switch SW2 positioned as shown, the system will be armed only when the owner presses switch SW1, which is shown in the dashboard radio 26 of FIG. 1. (Alternatively, the floorswitches FS1 of FIG. 2 can be operated by a hostage). Once depressed, switch SW1 sets flip-flop FF1 to apply a high signal to one input of AND gate Z1, whose other input can receive pulses from sensor SNSR.

Nothing further happens if the vehicle is not moving. If a thief now drives the vehicle, sensor 18 (FIG. 1) detects the passage of magnet 14 to produce pulses along line 20. As shown in FIG. 4, these pulses can be conveyed through AND gate Z1 to the counting input of counter CTR. Counter CTR can be preset to a count such as 700 to count down thereafter. When counter CTR is decremented to zero, its output becomes high which applies a driving signal along line 32 from driver 42 to solenoid valve 34. Consequently, the normally open valve 34B (FIG. 4) is closed.

As shown in FIG. 1, the closing of valve 34 prevents fuel from flowing from tank 36 through pump 38 to engine 40. Thus, after the fuel in the downstream lines, pump and carburetor are consumed, engine 40 will stall.

Alternatively, in systems lacking a solenoid valve, contacts S2 of relay 44 open to disable the ignition coil and thereby disable the vehicle.

In systems where the alarm and locking circuits are used, driver 46 operates relay coil 44 to close switch S1 and operate a siren, flash the vehicle headlights, sound the horn, lock the doors, and close or freeze the electric windows.

In systems which do not have keyswitch SW3 (FIG. 2) or footswitches FS2, the system must be reset by operating keypad KPD (FIGS. 1 and 4). A multi-digit code can be keyed into pad KPD and terminated by depressing an enter button. Thereafter, the keyed digits are stored in register RGR (FIG. 4) and decoded by decoder DCD. The resulting high signal triggers one-shot OS1 to produce a pulse along line RS. Consequently, flip-flop FF1 and counter CTR are disarmed. As a result, solenoid 34A is turned off to open valve 34B. Thereafter the engine can be cranked and re-started.

It will be appreciated that for embodiments employing the sensor systems of FIGS. 5 and 6 the operation will be similar except that the pulse train is generated in alternate fashions. In the system of FIG. 6, the pulse train is developed not by directly measuring the motion of the drive train but by sensing acceleration with an accelerometer. In the system of FIG. 5, the motion of the drive train is detected but not measured. When motion is occurring pulses from a clock circuit are forwarded to the counter so that the system responds to the driving time. This quantity should be contrasted to the time elapsed when the engine is running.

It is to be appreciated that various modifications may be implemented with respect to the above described preferred embodiments. The various circuit blocks can be fabricated from available integrated circuits or can be made from either larger scale integration or from discrete components. Alternatively, a microprocessor can be employed which would be programmed to perform the functions herein described, whereby the counting is performed by the programming itself. Also while digital circuitry is described, in some embodiments analog circuitry can be employed. Instead of a digital counter, an analog circuit can be employed to step up a predetermined increment for each rotation of the axle to trigger a threshold circuit when a sufficient distance is travelled. Furthermore, the distance travelled or the time elapsed before disabling the vehicle can be different in various embodiments or can be selected by the owner. Also, in some embodiments a keypad will not be necessary and a simple switch can be employed. Alternatively, the system can automatically restore itself after the elapse of a predetermined time interval, such as 10 minutes. Also the magnet and magnetic sensor for counting wheel revolutions can be a self-contained unit in which the rotating magnet is driven on a separate spindle off the wheel axle. Furthermore, the vehicle can be disabled in alternate fashions, including disabling the transmission and other operating systems of the vehicle. Moreover, in some embodiments, the keypad and the arming button and the circuitry for determining the disablement point can all be contained in one package.

Obviously many modifications and variations of the present invention are possible in light of the above teachings. It is therefore to be understood that within the scope of the appended claims, the invention may be practiced otherwise than as specifically described.

I claim:

1. A security system for a motor vehicle having an engine and drive train, comprising:
    sensor means for detecting motion of said motor vehicle to provide a motion signal, said motion signal of said sensor means being arranged to signify distance travelled by said motor vehicle;
    sequencing means coupled to said sensor means and responsive to said motion signal for providing a disable signal after production of said motion signal, said sequencing means being operable to provide said disable signal in response to said motion signal signifying motion extending beyond a predetermined distance; and
    interrupt means coupled to said sequencing means for receiving said disable signal, said interrupt means being coupled to said engine for disabling said engine in response to said disable signal, whereby said motor vehicle is disabled only after motion of said vehicle is detected.

2. A security system according to claim 1 wherein said sequencing means is operable to provide said disable signal in response to said motion signal signifying an interval of motion of at least a predetermined magnitude.

3. A security system according to claim 1 wherein said sequencing means is operable to provide said disable signal after the expiration of a predetermined delay interval beginning in response to said motion signal.

4. A security system according to claim 1 wherein said sequencing means is operable to provide said disable signal after the expiration of a predetermined delay interval elapsing when said motion signal signifies motion of said motor vehicle.

5. A security system according to claim 2 wherein said drive train has a rotary member, said sensor means being operable to produce a signal signifying rotation of said rotary member.

6. A security system according to claim 5 wherein said motion signal of said sensor means provides pulses at a rate proportional to the speed of said rotary member.

7. A security system according to claim 6 wherein said sensor comprises:
    a magnetic source mounted on said rotary member to rotate therewith; and
    a magnetic sensor mounted on said motor vehicle and responsive to motion of said magnetic source.

8. A security system according to claim 5 wherein said interrupt means comprises a valve for interrupting fuel to said engine.

9. A security system according to claim 5 wherein said motor vehicle includes a fuel tank and a fuel pump for supplying fuel to said engine, said interrupt means comprising:
    an electrically operated valve serially connected between said fuel pump and said fuel tank.

10. A security system according to claim 2 wherein said engine has an ignition circuit, said interrupt means comprising:
    selector means for disabling the ignition circuit of said engine.

11. A security system according to claim 1 comprising:
    an operator actuatable switch connected to said interrupt means and adapted for mounting in said motor vehicle, said interrupt means being normally ineffective to disable said engine, said interrupt means being operable in response to said operator actuatable switch.

12. A security system according to claim 11 wherein said motor vehicle has a dashboard, passenger seats and a floor, said operator actuatable switch being adapted for mounting in said dashboard.

13. A security system according to claim 12 wherein said operator actuatable switch being adapted for mounting in said floor adjacent one or more of said passenger seats.

14. A security system according to claim 13 wherein said motor vehicle has radio mounted in said dashboard, said operator actuatable switch being adapted for mounting in said radio.

15. A security system according to claim 11 wherein said sensor means is coupled to said drive train to detect motion of said motor vehicle.

16. A security system according to claim 15 wherein said sequencing means is operable to provide said disable signal in response to said motion signal signifying an interval of motion of at least a predetermined magnitude.

17. A security system according to claim 15 wherein said motion signal of sensor means is arranged to signify distance travelled by said motor vehicle, said sequencing means being operable to provide said disable signal in response to said motion signal signifying motion extending beyond a predetermined distance.

18. A security system according to claim 11 comprising:
    release means coupled to said sequencing means eliminating said disable signal and allowing said engine to operate undisturbed by said sequencing means, so that said motor vehicle can be restored to operation after being disabled by said system.

19. A security system according to claim 18 wherein said release means comprises:
    a keypad for manually assembling a release code signal; and
    a decoder for deciphering said release code.

20. A security system according to claim 11 wherein said sequencing means is normally armed, said system comprising:
    manual means coupled to said sequencing means for disarming said sequencing means before production of said disable signal and allowing said engine to operate undisturbed by said sequencing means.

21. A security system according to claim 5 wherein said interrupt means comprises an alarm signalling device.

22. A security system according to claim 21 wherein said motor vehicle has a plurality of signal sources including lights and a horn, said alarm signalling device comprising: means for operating at least one of said signal sources.

23. A security system according to claim 21 wherein said motor vehicle has a plurality of securing devices including electrically operated locks, said alarm signalling device comprising: means for operating at least one of said securing devices.

24. A security system according to claim 5 wherein said sequencing means comprises:
a counter for counting revolutions of said rotary member and producing said disable signal in response to the revolutions exceeding a predetermined number.

25. A security system according to claim 24 wherein said counter is an electronic digital counter.

26. A method for securing a motor vehicle having an engine and drive train, comprising the steps of:
detecting motion of said motor vehicle and measuring the distance travelled by said motor vehicle; and
disabling said engine provided said motor vehicle departs in an interval of motion exceeding a predetermined magnitude after said motor vehicle moves more than a predetermined distance, whereby said motor vehicle is disabled only after its motion is detected.

27. A method according to claim 26 wherein the step of disabling is performed after the expiration of a predetermined delay interval beginning when the motor vehicle moves.

28. A method according to claim 26 wherein the step of disabling is performed after the expiration of a predetermined delay interval during which said motor vehicle is moving.

29. A method according to claim 26 wherein the step of disabling is performed by interrupting fuel to said engine.

30. A method according to claim 26 wherein the engine has an ignition circuit, and wherein the step of disabling is performed by disabling the ignition circuit of said engine.

31. A method according to claim 26 wherein said motor vehicle has an operator actuatable switch and wherein the step of disabling is performed provided the operator actuatable switch is operated first.

32. A method according to claim 31 wherein said motor vehicle has an operator actuatable switch and wherein the step of disabling is performed if the operator actuatable switch is operated first by foot.

33. A method according to claim 31 further comprising the step of:
restoring said motor vehicle to operation after being disabled.

34. A method according to claim 33 wherein the step of restoring is performed by:
issuing a release code; and
deciphering said release code before restoring said motor vehicle to operation.

35. A method according to claim 33 wherein the step of disabling is performed unless manually prevented before said engine is disabled.

36. A method according to claim 29 comprising the step of:
signalling an alarm when said engine is disabled.

37. A method according to claim 36 wherein said motor vehicle has lights and a horn, the method comprising one or more of the following steps:
operating said lights when said engine is disabled; and
operating said horn when said engine is disabled.

38. A method according to claim 36 wherein said motor vehicle has electrically operated locks, the method comprising the step of:
locking said locks when said engine is disabled.

39. A method according to claim 26 wherein said motor vehicle has rotary member in said drive train, the method comprising the step of:
counting revolutions of said rotary member and disabling said engine in response to the revolutions exceeding a predetermined number.

40. A security system for disabling a motor vehicle having an engine and drive train after said motor vehicle has left a vicinity, comprising:
sensor means for detecting departure of said motor vehicle from said vicinity and providing a variable motion signal signifying an interval of motion of said motor vehicle;
sequencing means coupled to said sensor means for providing a disable signal in response to production of said variable motion signal at a magnitude signifying departure of said motor vehicle in an interval of motion exceeding a predetermined amount, said sequencing means being operable to provide said disable signal after the expiration of a predetermined time delay interval, said delay interval beginning in response to departure of said motor vehicle as indicated by said motion signal; and
interrupt means coupled to said sequencing means for receiving said disable signal, said interrupt means being coupled to said engine for disabling said engine in response to said disable signal, whereby said motor vehicle is disabled only after its motion is detected.

41. A security system according to claim 40 wherein said sensor means comprises:
accelerometer means mounted on said motor vehicle and responsive to acceleration of said motor vehicle for providing a motion signal signifying departure of said motor vehicle a predetermined distance from said vicinity.

42. A security system according to claim 1 wherein said sensor means comprises:
accelerometer means mounted on said motor vehicle and responsive to acceleration of said motor vehicle for providing a motion signal signifying departure of said motor vehicle.

* * * * *